United States Patent [19]

Urbaschek

[11] 4,109,921
[45] Aug. 29, 1978

[54] SEAL FOR PISTONS AND PISTON RODS OF CYLINDER-TYPE ACTUATORS

[75] Inventor: Herbert Urbaschek, Weilrod, Fed. Rep. of Germany

[73] Assignee: Taunus-Armaturen GmbH, Camberg, Fed. Rep. of Germany

[21] Appl. No.: 690,630

[22] Filed: May 27, 1976

[51] Int. Cl.² .............................................. F16J 15/20
[52] U.S. Cl. ................................... 277/24; 277/165; 277/170
[58] Field of Search .................... 277/24, 170, DIG. 6, 277/164, 165, 168, 169

[56] References Cited

U.S. PATENT DOCUMENTS

| 2,600,321 | 6/1952 | Pyle | 277/DIG. 6 |
| 3,323,806 | 6/1967 | Smith et al. | 277/165 |
| 3,326,562 | 6/1967 | Deuring | 277/164 |
| 3,549,154 | 12/1970 | Jones | 277/165 |
| 3,642,290 | 2/1972 | Millsap | 277/24 |
| 3,759,148 | 9/1973 | Geoffroy | 277/165 |
| 3,915,461 | 10/1975 | Gautier | 277/170 |

FOREIGN PATENT DOCUMENTS 933,136  8/1963  United Kingdom ............... 277/24

Primary Examiner—Robert I. Smith
Attorney, Agent, or Firm—Joseph A. Geiger

[57] ABSTRACT

An annular seal for pistons and piston rods of cylinder-type actuators, especially hydraulic actuators, where a first sealing ring of highly elastic material is received inside an annular groove in such a way that a sharp edge of the ring exerts an elevated contact pressure against a cooperating sliding surface which creates dry friction and which shears and smoothens a dry lubricant coating on the sliding surface which has previously been deposited there by a second, plastically yielding sealing ring received inside the same annular groove.

9 Claims, 4 Drawing Figures

SEAL FOR PISTONS AND PISTON RODS OF CYLINDER-TYPE ACTUATORS

BACKGROUND OF THE INVENTION

1. Field of the Invention

The present invention relates to annular seals for moving parts of cylinder-type actuators which include seals for pistons moving inside cylinder bores and seals for piston rods moving inside guide bores.

2. Description of the Prior Art

It is known from the prior art to use for seals of the above type a sealing ring of approximately rectangular cross section of non-metallic material which is seated in an annular groove the depth of which is less on the axial end facing towards the pressure space of the actuator than on the opposite end, whereby the minimal radial distance between the groove base and the sliding surface of the cooperating member is smaller than the radial height of the sealing ring. Known annular seals of this type are employed for low pressure sealing applications and employ sealing rings of natural or synthetic rubber. They are mounted with a comparatively small radial preload — typical for this type of material — on the axial side facing towards the pressure space. These sealing rings thus have a seating groove which is somewhat deeper on the side facing away from the pressure space, so that the back portion of the sealing ring contacts the cooperating sliding surface without pressure, at least under low operating pressures, in order to reduce friction and wear. Seals constructed in this manner are normally not suited for general application in cylinder-type actuators, for the following reasons:

(a) The radial compression of the sealing ring, though comparatively small, produces a contact pressure at the sealing lip of the ring which, especially under slow actuator movements, strips the film of liquid pressure medium, which is essential for the longevity of this type of seal, clean off the sliding surface, so that the seal is prematurely destroyed by friction.

(b) Under rapid actuator movements, on the other hand, the low radial compression in the area of the sealing lip is insufficient to prevent the passage past the sealing ring of an unacceptably heavy liquid film which, in the case of piston rod seals, escapes to the outside of the actuator.

(c) Under high operating pressures, the sealing ring undergoes axial compression so that the back portion of the ring is likewise pressed against the sliding surface. Thus, when an operating pressure of 80 bar is present, for example, the specific contact pressure at the back portion of the sealing ring is approximately 80 kp/cm², while the contact pressure at the sealing lip normally does not exceed 95 kp/cm² under such conditions. Whenever a seal of this type is subjected to this sort of operating conditions, it produces such high friction that, even with a super-finish machined on the sliding surface, it leads to a jerky initiation of movement of the moving actuator member and to a rapid failure of the seal as a result of frictional wear.

It is further known to use seals featuring a self-lubricating sealing member of substantially plastically yielding material which is arranged between the metallic sliding surface and an elastically yielding sealing member, producing a contact pressure through its inner deformation stress. However, the sealing members of this type of seal are seated inside an annular groove which has a cylindrical groove bottom.

Plastically yielding sealing elements which are used in this way have shown to give a comparatively weak sealing action under rapid actuator movements, and they are highly susceptible to the influence of dirt particles contained in the pressure medium to be sealed, as well as to the normal fabrication-related surface roughness of the sliding surfaces involved. Prior art consensus therefore limits the use of this type of seal to piston seals only, where the piston cooperates with a cylinder bore of super-finished surface quality, the roughness of which is below $R_t = 2.0\mu$, whereby it is further absolutely necessary to employ superfine filters for the removal of dirt particles from the pressure medium which is to be sealed. The comparatively weak sealing action under rapid actuator movements, as well as the high susceptibility of these known self-lubricating sealing members — the latter being, for example, rings of polytetrafluoroethylene, or rings of other suitable plastic materials having a high admixed content of solid dry lubricant — can be ascribed to the fact that these rings have basically only a very low degree of elasticity and that elevated localized stress conditions inside the rings disappear by themselves as a result of cold flow taking place inside the body of the rings.

The movement of the sliding surface relative to the sealing ring tends to entrain a certain amount of liquid pressure medium past the sealing ring, as a result of the adherence of the liquid to that surface. This so-called drag flow is also known under the designation of Poiseulle drag flow. With seal configurations of the above-mentioned type, such a drag flow is only than completely eliminated, when a sharp stripping edge is provided on the pressure-side flank of the sealing member, and when a markedly higher radial contact pressure is created on that stripping edge, as compared to the contact pressure which exists on the remaining axial length portion of the sealing member. It has been found that the creation of such an elevated contact pressure and the maintenance of a sharp stripping configuration on the sealing edge of a sealing member of plastically yielding material is impossible.

The fact that this type of seal thus becomes inevitably subject to a certain drag flow, whenever the actuator moves, is indicative of unsatisfactory sealing contact and leads to a further separation of the leading length portion of the sealing member from the sliding surface as a result of a wedging action of the aforementioned drag flow, which thereby leads to the introduction and wedging of pressure-medium-carried dirt particles into the resulting tapered annular gap. The leading length portion of the sealing member is that portion which faces against the relative movement of the sliding surface.

As a consequence of the above, the following will happen: Abrasive foreign bodies become lodged in the sealing member, wear takes place on the metallic sliding surface, and the seal will be destroyed prematurely.

The susceptibility of the aforementioned seals to surface roughness of the sliding surfaces can likewise be attributed to the inadequate elasticity of the self-lubricating sealing rings of the mentioned prior art solution, although the low resistance values of the materials used constitute another important reason for this problem.

In a still further prior art seal of the aforementioned type, a special sealing element of low-elasticity material is so arranged that it prevents the extrusion of a portion of the sealing ring into the sealed gap under the application of high pressure to the seal.

This seal configuration is based on the known principle that a sealing effect can be obtained between two relatively movable parts with the help of the pressure of the pressure medium, when the cooperating parts are so constructed that a radially oriented pressure area is exposed to the pressure medium, whereby this pressure area is larger than the corresponding contact area of the sliding surface against which the sealing element is supported.

With this configuration is obtained a proportional change of the sealing contact pressure as a function of the operating pressure, so that an improved sealing action is obtained under high pressure operation, as a result of the elimination of the Poiseulle drag flow. The latter ceases when the contact pressure is at or above a certain level. This type of seal is further characterized by a tangential preload on the sealing element which intrinsically produces a lesser contact pressure between the sealing element and the sliding surface in the low pressure range and under operation with a non-pressurized pressure medium, as compared to the radial preload of the previously discussed prior art versions. This condition, combined with the fact that the sealing lips of the sealing element have chamfered edges, lead to an accentuated Poiseulle drag flow and higher susceptibility to dirt particles in the pressure medium, so that this type of seal is unsuitable for cylinder-type actuators which have to operate under medium and low pressure conditions.

In addition to the fact that this type of seal is thus only suitable for high pressure applications, lacking the operational versatility which is required for cylinder-type actuators, its manufacture is complicated and costly because of the complex shape of the sealing elements and because of the radial cumulation of manufacturing tolerances of the two sealing members, which requires high-precision fabrication.

Apart from the specific limitations of application which have been listed above for the various known prior art seals, the latter are, without exception, usable only in cooperation with sliding surfaces of high precision having a super-finished surface. Unlike the aforementioned seals, however, there exists another known prior art seal which is suitable for cooperation with sliding surfaces of comparatively pronounced roughness. This particular seal is constituted by a conventional sealing ring, seated inside an annular groove, and an additional ring of a material intended to cover the surface roughness of the sliding surface, the second ring being seated on the back side of the sealing ring.

Because any contact pressure of the sealing lip against the cooperating sliding surface which is higher than the particular operating pressure can only be obtained through the tangential preload on the sealing element, the same difficulties are present in this case as have been described earlier. It follows that this type of seal requires an additional low pressure seal with a radially preloaded sealing element, in order to obtain the necessary radial contact pressure under low pressure operation. This arrangement, however, has the shortcoming that it is not capable of preventing the penetration of dirt particles into the high pressure seal. The latter are carried by the pressure medium into the space between the high pressure and low pressure seals.

An additional shortcoming of the last-mentioned prior art arrangement relates to the fact that the combination of a low pressure seal with an expensive high pressure sealing ring, which necessitates ground chamfers on the sealing lips of the ring, is a very costly and complex solution. A particular problem relates to that grinding operation on the sealing lips of the sealing element which must be performed with the utmost care, since even the minutest grinding grooves on the sealing edges greatly increase the susceptibility of the seal to dirt particles.

A still further shortcoming of this known seal is that the weak tangential preload of the sealing lip of the high pressure sealing ring is unable to prevent the creation of a film of pressure fluid between the additional ring which is to fill in the surface roughness and the sliding surface under operating movements. However, as we are taught by the literature relating to this type of seal, the existence of such a film of liquid pressure medium — the latter is normally hydraulic fluid — impedes the firm attachment of the crystalline solid lubricant which is deposited by the additional ring on the cooperating sliding surface. It follows that the formation of a smooth continuous coating of dry lubricant is very difficult. It is further possible that the adhesion-enhancing polarization forces of the dry lubricant can become completely neutralized through the action of the additives which are contained in the hydraulic fluids. These include EP agents, detergent additives, or dispersing additives.

The above-mentioned interactions lead to a situation in which the roughness valleys in the sliding surface are not completely filled in and roughness peaks are not covered by the dry lubricant, so that the latter lead to steady wear on the sealing element, while, through the repeated deposition of dry lubricant in the roughness valleys, the additional ring is being progressively consumed.

SUMMARY OF THE INVENTION

It is a primary objective of the present invention to improve upon the prior art by avoiding the various disadvantages and shortcomings of the various known seal configurations for pistons and piston rod guide bores of cylinder-type actuators in conjunction with a novel annular seal which is designed to withstand high operating pressures and which safely precludes the formation of a pressure-medium-derived liquid film on the sliding surface, both at high pressures and at lowest pressures, without thereby becoming subject to unacceptable wear. At the same time it must allow for the use of relatively rough cooperating sliding surfaces in the cylinders.

A subsidiary objective of the invention is the immediate formation on the metallic sliding surface, under initial operational use, of a pressure resistant, closed coating of dry lubricant which is firmly anchored to the sliding surface substrate as a result of polarization forces, whereby the formation of such a coating is not to be adversely affected either by the liquid pressure medium itself, or by its detergent or dispersing additives.

Furthermore, the looked-for seal configuration is to remain unsusceptible to dirt particles carried by the pressure medium and it has to safely prevent the embedding of any dirt particles in the seal or in the metallic sliding surfaces.

Lastly, the invention aims at a most simple shape of the constituent parts, with the result that the novel seal configuration is very economical in production. One factor contributing to this end is the use of a plain, sharp-cornered, knife-cut sealing lip in the place of the chamfer-ground prior art sealing lip, with its attendant risk of wear-enducing grooves created by the grinding operation.

The present invention proposes to attain the above objectives by suggesting a novel seal configuration which is characterized in that it features a sealing ring of a highly elastic, highly resilient material of substantially rectangular cross section which is received inside an annular groove whose minimal radial depth is smaller than the radial height of the sealing ring by such an amount that the resulting deformation of the sealing ring produces a localized radial contact pressure of such magnitude that a dry-sliding condition exists at the pressure-side edge of the sliding ring, and that it additionally features a second ring of plastically yielding, non-self-lubricating material containing a high proportion of molybdenum-disulfide, which ring is arranged in the annular groove holding the sealing ring, axially between the latter and a planar flank of that groove.

The novel seal configuration of the invention distinguishes itself in particular through the use of a sharp sealing lip of highly elastic material which contacts the sliding surface of the seal with an elevated radial preload, thereby safely stripping from the sliding surface any dirt particles deposited by the pressure medium and positively preventing any Poiseulle drag flow at highest and lowest pressure conditions, even under rapid sliding movements of the cylinder-type actuator. Although the resulting friction condition on the sliding surface is a pressure-enforced dry friction condition, the actual friction forces generated on the moving parts turn out to be extraordinarily low, on account of a pressure resistant dry lubricant coating which is maintained on the sliding surface under all operative conditions by the dry lubricant which is being dispensed by the plastically yielding second sealing member.

The novel seal configuration also fulfills an important prerequisite for the maintenance of optimal dry lubrication conditions, viz. a firm and permanent anchorage of the dry lubricant molecules to the sliding surface substrate through polarization forces, as the initial sliding movements cause the dry lubricant to be firmly rubbed onto the sliding surface and to be oriented in the direction of movement. One important aspect of this function of the present invention is related to the fact that, because the formation of a liquid film between the sliding surface and the plastically yielding second sealing member is positively prevented, the anchoring of the dry lubricant molecules through polarization forces can take place unimpeded, in contrast to a situation where, in the presence of such a liquid film, the EP agents, detergent additives, or dispersing additives in the pressure medium — assuming that it is hydraulic fluid — tend to prevent the establishment of the desired dry lubricant anchorage through polarization forces.

In addition to offering the above operational advantages, the invention is further characterized in that extremely simple shapes are used for the constituent members of the seal configuration, with the result that the manufacturing and tooling costs are greatly reduced in comparison to the prior art solutions.

In accordance with a preferred embodiment of the present invention, the annular groove receiving the sealing ring is given such a radial depth on the axial side facing towards the pressure space that the relationship between the radial gap to the sliding surface and the radial height of the sealing ring, in consideration of the elastic deformation characteristics of the sealing ring material, is such that an elevated radial contact pressure between the sealing ring and the sliding surface is present at all times, whether or not this radial contact pressure is augmented as a result of the actuator operating pressure and actuator movement, whereby the preload-derived contact pressure alone is sufficient, during the initial run-in operation of the device, to shear off the monocrystalline dry lubricant lamellae and to produce a perfectly smooth, homogeneous coating of dry lubricant on the sliding surface.

According to established practical guidelines, annular grooves for sealing rings of compact seal configurations are normally of such a radial depth that sealing rings of natural or synethetic rubber undergo a radial compression between 4 and 15 percent. Measurements of the radial contact pressures resulting from such a deformation of the sealing ring have shown that the contact pressures obtained reach levels which are at most some 15 bar higher than contact pressures which result from the operating pressure in the pressure medium. Where the preload on the sealing ring is of the tangential type, the resulting maximum additional contact pressure on the sliding surface is much lower even.

When dry lubricants on the basis of $MoS_2$ are used, the above-mentioned radial pressure values are just about adequate to shift $MoS_2$ flakes which adhere loosely to $MoS_2$ crystals, with the result that the lubricant surface obtained is comparatively smooth, but retains depressions and clearly distinguishable grain boundaries. The coefficient of friction of such a surface lies in the neighborhood of $\mu = 0.1$ and will remain constant at this level.

The present invention now proposes, among other things, an approach previously never practiced in the sealing art, suggesting an increase in the radial contact pressure preload to at least twice the above-mentioned values by which the contact pressure exceeds operating-pressure-derived contact pressures, viz. between 40 and 130 bar contact pressure with a pressureless pressure medium, whereby, under appropriate actuator movements, shear forces on the dry lubricant coating are obtained which are capable of shearing off $MoS_2$ lamellae from anchored monocrystalline plates of lubricant.

It is known that the above-described shearing action produces an extremely smooth, firm and compact $MoS_2$ coating so that, even under great magnification, hardly any exposed edges of $MoS_2$ lamellae are discernible. Following termination of this monocrystalline lamellae-shearing sliding action, the coefficient of friction of such a surface stabilizes at $\mu = 0.03$.

Experiments which have been conducted with the novel seal configuration of the invention confirm the results of earlier scientific studies on the physics of $MoS_2$ lubrication:

(a) Using a cylinder-type actuator with comparatively rough sliding surfaces ($R_t$ = approx. $18\mu$), the pressure necessary in the pressure medium for an initial movement of the actuator fell, after only a few movements, from approximately 7 bar to less than 2 bar, remaining constant thereafter.

(b) A microscopic examination of the sliding surface obtained this way revealed no discontinuities in the coating. The original surface roughness had been reduced to $R_t = 0.4\mu$.

(c) The stick-slip phenomenon (jerky motion under slow movement start-up), which is a common characteristic of cylinder-type actuators, had been completely eliminated, a confirmation of the scientifically determined fact that, with a well-formed $MoS_2$ sliding surface layer, the static friction is equal to, or smaller than the dynamic friction.

(d) It was impossible to produce any wear traces on the sealing rings or on the dry lubricant rings either under exceptionally long continuous operation at high pressure (test pressure level: 315 bar), or under very low operating pressures.

The aforementioned test results obtained with the seal of the present invention mean the refutation of a long-held notion among specialists in the field of sealing technology, viz. the assumption that the friction, the stick-slip phenomenon, and the wear on sealing elements can only be reduced through a reduction in the contact pressure preload. This invention proves that, when dry lubricants are applied under appropriate conditions, the opposite condition will obtain: A radial preload higher than the preloads which have previously been used in connection with such seals will not only produce a practically absolutely tight seal, it will greatly increase the longevity of the seal, while reducing the sliding friction in the seal to a surprisingly low value.

By way of a further refinement of the present invention, the preferred embodiment features a sealing ring of cross-linked polyurethane having a modulous of elasticity in the order of approximately 750 kp/cm². Because of the excellent values of elasticity, tensile stress, tear propagation resistance, and abrading resistance which are obtained with this material, it has been found that the sealing lip in the form of a sharp-cornered stripping edge on the elastic sealing member remains intact, even after long periods of operation under high radial preload.

The modulus of elasticity of the best previously used sealing rings of natural or synthetic rubber lies in the neighborhood of 100 kp/cm². Since the deformation resistance is a direct function of the modulus of elasticity, the switch to a material of a much higher modulus produces a correspondingly higher contact pressure under an identical amount of radial deformation, without any additional modifications. As a consequence, it becomes readily possible to obtain the earlier-described shearing action in which dry lubricant lamellae are sheared off monocrystalline plates of lubricant deposited on the sliding surface.

The excellent dry lubricant surface coating obtained in this manner has a still further advantage, inasmuch as the reduced friction also reduces the frictional heat to a level which makes it possible to employ sealing rings of cross-linked polyurethane which are susceptible to hydrolysis, and which would otherwise be unsuitable for use in a situation where traces of water are present in the pressure medium. The seal of the present invention, however, gives excellent results, even in the presence of such water traces and at the commonly encountered elevated operating temperatures in the hydraulic system (approximately 100° C).

According to still another refinement of the present invention, a preferred embodiment thereof features a plastically yielding second sealing ring consisting of two constituent elements containing different dry lubricant substances of which the first substance has a pronounced adhesive characteristic, based upon its chemical affinity to the substrate material of the cooperating sliding surface, while the second dry lubricant substance is chemically inert to the material of the sliding surface.

The first one of these two dry lubricant substances is preferably molydenum-disulfide. In the course of an actuator movement, it is deposited on the sliding surface, for instance the wall of a steel tube or the surface of a steel piston rod, covering the roughness of the sliding surface with very strong adherence thereto created by polarization forces, or with a bond resulting from the chemical reaction $MoS_2 + 2\ Fe \rightarrow 2\ FeS + Mo$.

This initially deposited, relatively rough layer of the first, crystalline dry lubricant is then filled in and smoothed over with the second dry lubricant, which is preferably polytetrafluoro-ethylene, which, following the necessary plastic deformation in adaptation to the layer of first dry lubricant, establishes a firm mechanical connection with the latter. The end result is a composite dry lubricant coating of extremely dense and smooth surface quality, which is firmly connected to the metallic substrate of the sliding surface of the novel seal configuration. Test measurements have shown that, once such a composite dry lubricant coating has been established on the sliding surface, the normally occurring abrasion on the sealing members ceases completely, for all practical purposes.

In this case, as in the previously described embodiment using only $MoS_2$ as a dry lubricant, the coefficient of friction between the sliding members is greatly reduced, so that jerk-free movement starts of the actuator are assured and the friction-generated heat on the sealing contact surfaces is likewise greatly reduced. This, in turn, makes it possible to utilize sealing members of a highly elastic, but heat-sensitive plastic material, for example polyurethane, without running the risk of overheating the material.

A somewhat similar result can be obtained, when the plastically yielding second sealing ring is constituted so as to contain more than one type of dry lubricants, at least one of the lubricants having a high affinity to the substrate material of the sliding surface, while at least one other dry lubricant is chemically inert vis-a-vis the sliding surface, and the various dry lubricants are held in a supporting matrix of plastically yielding, non-self-lubricating material, such as modified polyolefin, for example.

It is important, in this context, that the carrier material which holds the dry lubricants does not impede the reactions taking place with respect to the several dry lubricants on the molucular level, and that the lubricant molecules are released in their active state at a comparatively low level of exterior strain.

The present invention makes it convenient and preferable to manufacture the constituent sealing rings of the novel seal with approximately identical inner and outer diameters, respectively, in the free state, so that the sealing rings can be economically produced by first producing a tubular profile and than slicing the rings off the profile in a precision cutting operation. This manufacturing method greatly simplifies the necessary manufacturing tooling and it reduces the range of different sizes that have to be stocked, since it makes it possible to use one particular size of sealing ring for a piston rod seal as well as for a piston seal, provided the piston itself has a correspondingly larger diameter. All in all, the constituent parts of the seal configuration of the present invention can be mass-produced at very low cost.

BRIEF DESCRIPTION OF THE DRAWINGS

Further special features and advantages of the invention will become apparent from the description following below, when taken together with the accompanying drawings which illustrate, by way of example, preferred embodiments of the invention, represented in the various figures as follows.

DESCRIPTION OF THE PREFERRED EMBODIMENTS

Figure 1:
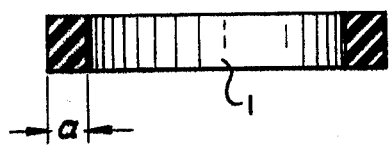
FIG. 1 shows the cross-sectional shape of a sealing ring designed for use in conjunction with a novel seal for pistons and piston rods suggested by the present invention.
Figure 2:
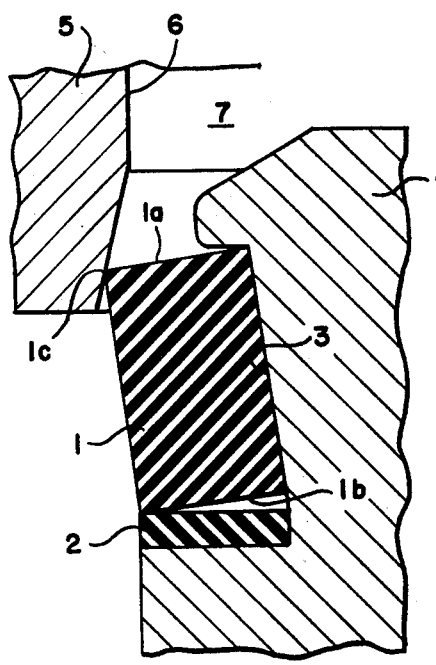
FIG. 2 is a greatly enlarged cross-section through a seal configuration, prior to assembly, featuring an elastic first sealing ring and a plastically yielding second sealing ring, as a first embodiment of the invention.

Referring to FIGS. 1 and 2 of the drawing, there is illustrated a first embodiment of the invention featuring a novel seal configuration which consists of a first sealing ring 1 and a second sealing ring 2, arranged in an axially contiguous relationship with the former, the two sealing rings being received inside an annular groove 3 of a piston 4 which forms a part of a cylinder-type actuator. The cooperating cylinder wall is shown at 5 as having a cylinder bore with a surface 6, the piston 4 and the cylinder wall 5 being shown in a position just prior to insertion of the piston into the cylinder bore.

In the case of a piston rod guide configuration, where the annular groove is arranged in the guide bore, the member containing that bore takes the place of the piston 4, and the piston rod itself takes the place of the cylinder wall 5. While in the piston-and-cylinder configuration the sliding surface 6 is the surface of the cylinder bore, in the piston-rod-and -guide-bore configuration the sliding surface 6 is the outer surface of the piston rod.

As FIG. 2 indicates, the annular groove 3 has a tapering bottom and the depth of the groove on the pressure side, as determined by the bottom diameter of the point which is closest to the pressure space 7, is considerably less than the radial height $a$ of the sealing ring 1 (FIG. 1). It follows that the sealing ring 1, when received in the groove 3, has a diameter on its sealing lip 1c, which, in the uninserted state, is greater than the diameter of the cylinder bore. Conversely, if the sealing ring 1 is similarly seated in an annular groove 3 of a piston rod guide bore, the diameter of the sealing lip 1c is correspondingly smaller than the diameter of the cooperating piston rod sliding surface 6, prior to insertion.

On the other hand, the radial depth of the annular groove 3, on the axial side facing away from the pressure space 7, is preferably equal to, or greater than the radial height $a$ of the sealing ring 1. It follows that the outer diameter of the received sealing ring 1 on its pressureless flank 1b, is equal to, or smaller than the diameter of the cooperating cylinder bore sliding surface 6, or that the corresponding inner diameter of a similar guide bore sealing ring is correspondingly equal to or larger than the diameter of a cooperating piston rod sliding surface 6, respectively.

These dimensions of the annular groove 3 and of the sealing ring 1, when received therein, create a radial compression of the sealing ring 1, when the seal is assembled, i.e. when the piston 4 is inserted in the cylinder 5, or the corresponding piston rod is inserted through the piston rod guide bore. This radial compression of the sealing ring between the bottom of the groove 3 and the concentrically spaced sliding surface 6 produces a radial pressure reaction on the compressed portion of the sealing ring 1, which is proportional to the degree to which the radial height of the compressed sealing ring 1 differs from the radial height $a$ of the free sealing ring 1 (FIG. 1). As is readily apparent from the configuration of FIG. 2, the resulting contact pressure between the sliding surface 6 and the sealing ring 1 has a maximum value at the outer edge or sealing lip 1c at the periphery of the pressure-side flank 1a of the ring, decreasing with increasing axial distance from the sealing lip 1c towards the opposite flank 1b. This pattern of contact pressure (see also FIG. 4) assures an optimal sealing action at the sealing lip 1c, which, by virtue of its sharp outline and the localized elevated contact pressure, safely prevents the occurrence of any Poiseulle drag flow across the contact interface and positively strips any dirt particles from the sliding surface 6 during each actuator movement.

The much narrower plastically yielding second sealing ring 2 is axially sandwiched between the rear flank 1b of the first sealing ring 1 and a planar flank of the annular groove 3. In this position, the sealing ring 2 is completely enclosed on all sides, supplying dry lubricant to the sliding surface 6, when the actuator executes a movement. The dry lubricant coating thus deposited on the sliding surface 6 is not only rubbed against that surface, but also sheared off smoothly by the sharp sealing edge 1c of the sealing ring 1, with the effect that the sliding friction against the sliding surface 6 and the generation of heat on that surface are reduced to a level which is far lower than that encountered with conventional seal configurations, where the lubrication of the sealing interface is provided by the pressure medium in the range of mixed friction, or where dry lubricants are utilized, but the contact pressure between the sealing ring and the cooperating sliding surface is inadequate to produce a homogeneous, absolutely smooth and firmly anchored coating of dry lubricant on the sliding surface.

Figure 3:
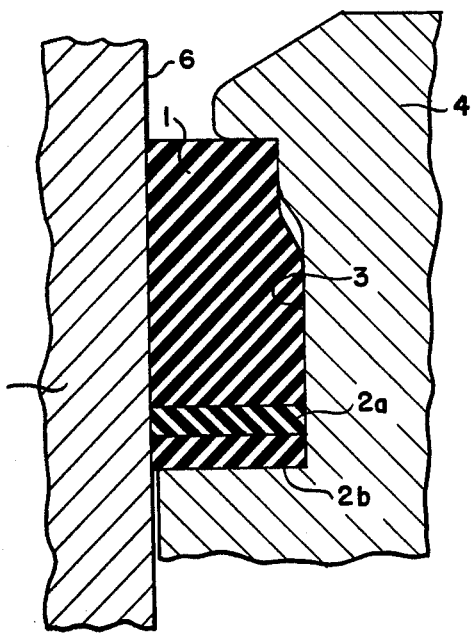
FIG. 3 is a similarly enlarged cross section through a modified seal configuration, featuring an elastic first sealing ring and a composite plastically yielding second sealing ring, as a second embodiment of the invention.

In FIG. 3 is shown a second embodiment of the present invention, where the second sealing ring 2 has been modified to consist of two constituent discs 2a and 2b carrying different dry lubricants. FIG. 3 shows these two discs in an assembled, but not pressurized configuration. The embodiment of FIG. 3 is otherwise very similar to the previously described embodiment of FIG. 2, except for a modified bottom portion of the annular groove 3 which, instead of tapering from a maximum diameter on the pressure side to a minimum diameter on the opposite side, has cylindrical portions corresponding to said maximum and minimum diameters and an intermediate transition portion. Overall, the important features of this embodiment are comparable to those of the earlier embodiment, so that the description given in connection with the latter applies to both embodiments.

Figure 4:
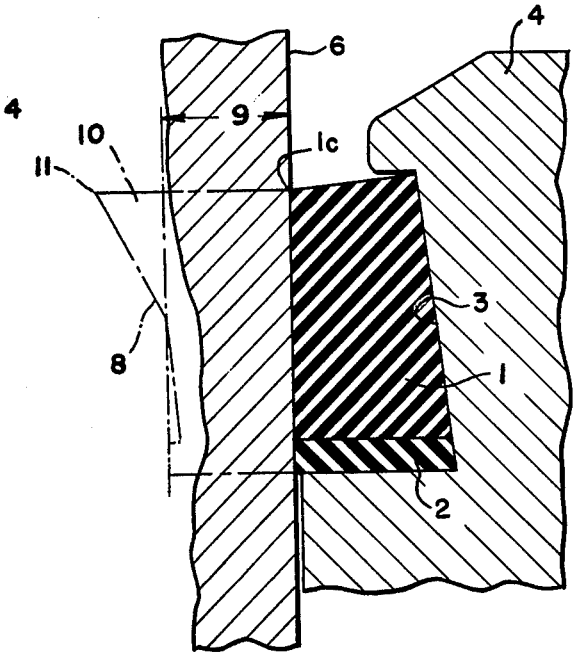
FIG. 4 shows the seal configuration of FIG. 2 in the assembled state and under pressure conditions, a superimposed graph indicating the changes in contact pressure over the axial width of the sealing rings.

In FIG. 4 is shown the seal configuration of FIG. 2 in an assembled, pressurized state. On the contact area between the two sealing rings 1 and 2 and the cooperating sliding surface 6 is superimposed a graph 8 depicting the changes in contact pressure which take place over the axial width of the two sealing rings, under the influence of an operating pressure in the pressure space 7. The contact pressure curve thus constitutes the sum of a variable, but axially uniform pressure, indicated at 9, and a predetermined, but localized preload-derived contact pressure 10 which has its maximum value at the sealing lip 1c.

The variable, axially uniform pressure level 9 is a direct function of the operating pressure applied to the pressure space 7. In the example illustrated in FIG. 4, this pressure level reflects an operating pressure of 80 bar, the added preload pressure on the sealing lip 1c being 40 bar, for a maximum pressure level 11 of 120 bar, at the sealing lip 1c.

The optimal value of the operationally most important contact pressure level, i.e. the maximum pressure level 11 at the sealing lip 1c, is determined by establishing the required radial height $a$ of the sealing ring 1 and the necessary radial compression at the pressure-side flank 1a in the radial gap between the maximum diameter of the bottom of groove 3 and the diameter of the sliding surface 6, so that the resultant radial compression, in conjunction with the modulus of elasticity of the sealing ring material, creates a permanent localized contact pressure at the sealing lip 1c. This pressure must be such that the establishment of a Poiseulle drag flow is positively prevented at all anticipated actuator speeds and viscosities of the pressure medium, and that a reliable sealing action is also obtained under low pressure operation as well as in the pressureless state.

It should be understood, of course, that the foregoing disclosure describes only preferred embodiments of the invention and that it is intended to cover all changes and modifications of these examples of the invention which fall within the scope of the appended claims.

I claim the following:

1. An annular sliding seal for axially guided concentrically paired elements, particularly for piston and cylinder pairings and piston rod and piston rod guide bore pairings of cylinder-type hydraulic actuators, the seal comprising in combination:
    a cylindrical sliding surface defined by one of the two concentric elements, said sliding surface being a bore, if defined by the outer element, and a cylindrical outer surface, if defined by the inner element;
    an annular groove in the other one of the two concentric elements, the groove being radially open towards the sliding surface and having axially spaced groove flanks and a groove bottom;
    a first sealing ring of highly elastic, highly resilient material received within said annular groove; said sealing ring having a quadrangular cross section circumscribed by a pressure-side substantially radial flank, a pressureless flank, a received periphery in contact with the groove bottom, and a sliding periphery; said cross section having a sharp sliding edge on at least the corner between the pressure-side flank and the sliding periphery of the sealing ring; and the radial height of the sealing ring on said sharp sliding edge in relation to the diameter of the sliding surface being such that, while moving along the sliding surface, the sealing ring portion which includes that edge is radially compressed between the sliding surface and the groove bottom to such an extent that the sharp sliding edge of the ring removes any hydraulic fluid from the sliding surface and engages said surface under dry friction; and
    a second sealing ring of plastically yielding material likewise received within said annular groove and axially confined between the pressureless flank of the first sealing ring and the respective flank of the groove, the second sealing ring holding a dry lubricant in such a way that said lubricant is released against the sliding surface under motion.

2. A seal as defined in claim 1, wherein
    the cross section of the first sealing ring, prior to insertion into the groove is rectangular, the ring having cylindrical inner and outer surfaces to; and
    the bottom of the annular groove receiving said ring is higher under the pressure-side flank of the ring than under its pressureless side, so that the resultant contact pressure between the first sealing ring and the sliding surface is highest at said sharp sliding edge of the ring.

3. A seal as defined in claim 2, wherein
    said groove bottom is tapered, the annular groove being deepest in the area occupied by the second sealing ring.

4. A seal as defined in claim 2, wherein
    the second sealing ring is of a non-self-lubricating material;
    the dry lubricant held by said ring is, at least to a major extent, molybdenum disulfide which, under initial movements of the ring along the sliding surface, forms on the latter a layer of monocrystalline lamellae of dry lubricant; and
    the radial height of the first sealing ring in relation to the radial space between the groove bottom and the sliding surface is such that the resultant radial compression of the sealing ring creates such a contact pressure on its sharp sliding edge that the latter will create a shearing action on the deposited dry lubricant lamellae for the formation of an outwardly smooth, homogeneous coating of dry lubricant.

5. A seal as defined in claim 4, wherein
    the second sealing ring is composed of two constituent parts holding different dry lubricants, one dry lubricant having a pronounced adhesive affinity in relation to the substrate of the sliding surface, while the other dry lubricant is chemically inert in relation to said surface.

6. A seal as defined in claim 4, wherein
    the second sealing ring holds at least two different types of dry lubricant of which at least one has a high affinity to the sliding surface, while another one is chemically inert in relation thereto, the dry lubricants being supported by a supporting matrix in the second sealing ring.

7. A seal as defined in claim 1, wherein
    the second sealing ring is made of modified polyolefin.

8. A seal as defined in claim 1, wherein
    the first sealing ring is made of cross-linked polyurethane, having a modulus of elasticity of approximately 750 kp/cm$^2$.

9. A seal as defined in claim 1, wherein
    the first and second sealing rings have substantially the same inner and outer diameters in their free state.

* * * * *